United States Patent [19]

Knapp

[11] Patent Number: 4,490,934
[45] Date of Patent: Jan. 1, 1985

[54] RIGID MECHANICAL CORNER POCKET FOR TENSIONING FLEXIBLE SIGNS AND SIGNAL DEVICES

[75] Inventor: Michael D. Knapp, Elmira, N.Y.

[73] Assignee: Eastern Metal of Elmira, Inc., Elmira, N.Y.

[21] Appl. No.: 474,777

[22] Filed: Mar. 14, 1983

[51] Int. Cl.³ .............................................. G09F 17/00
[52] U.S. Cl. ...................................... 40/603; 40/606; 40/610; 40/612
[58] Field of Search ................. 40/603, 607, 606, 610, 40/612, 613; 116/63 P; 248/488

[56] References Cited

U.S. PATENT DOCUMENTS

| 1,873,178 | 8/1932 | Bernstein | 40/603 |
| 3,200,786 | 8/1965 | Swezy et al. | 40/610 |
| 3,526,200 | 9/1970 | Doyle | 116/63 P |
| 4,288,053 | 9/1981 | Sarkisian | 248/231.4 |

Primary Examiner—Gene Mancene
Assistant Examiner—Cary E. Stone
Attorney, Agent, or Firm—Seidel, Gonda & Goldhammer

[57] ABSTRACT

A signal device includes a frame supporting a flexible sheet having indicia on one face. A plurality of oppositely disposed retainers are fixed to the other face of the sheet. A portion of the frame extends into each retainer to rigidify the sheet. Each retainer includes a movable member for controlling entry and removal of the associated portion of the frame.

15 Claims, 9 Drawing Figures

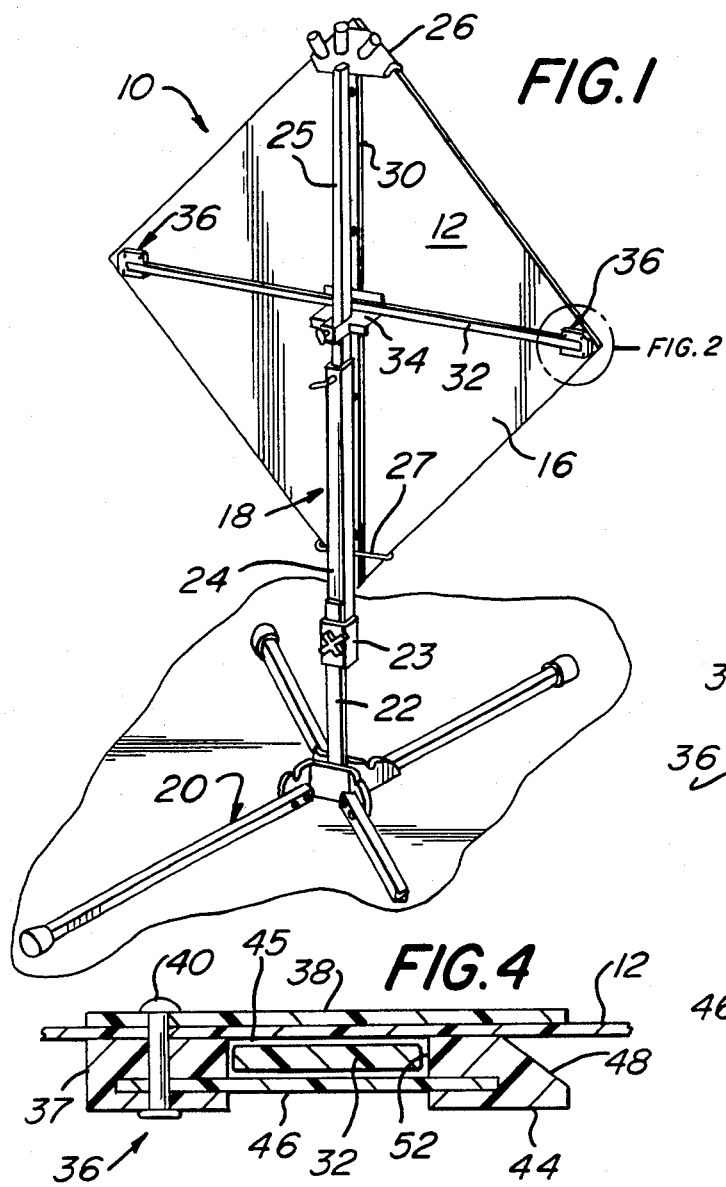
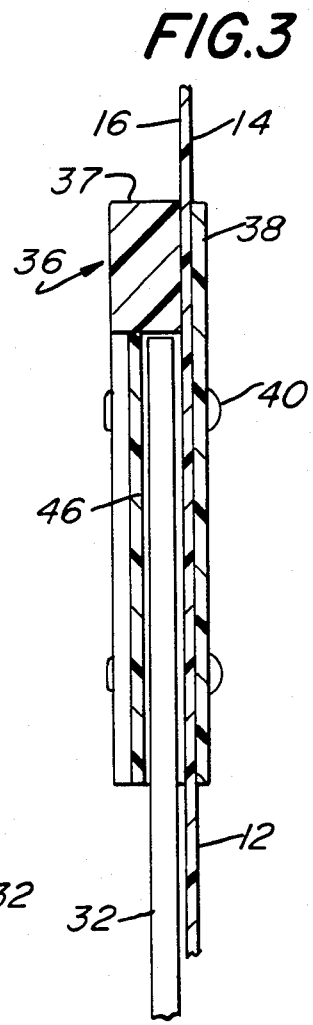
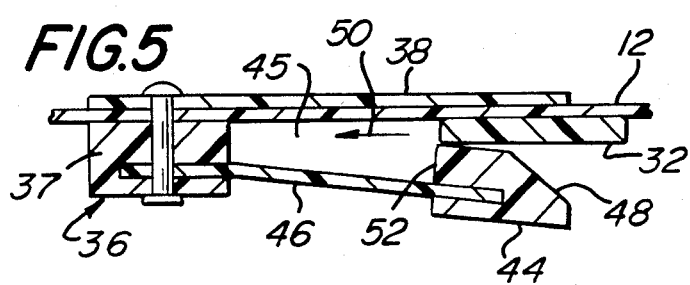

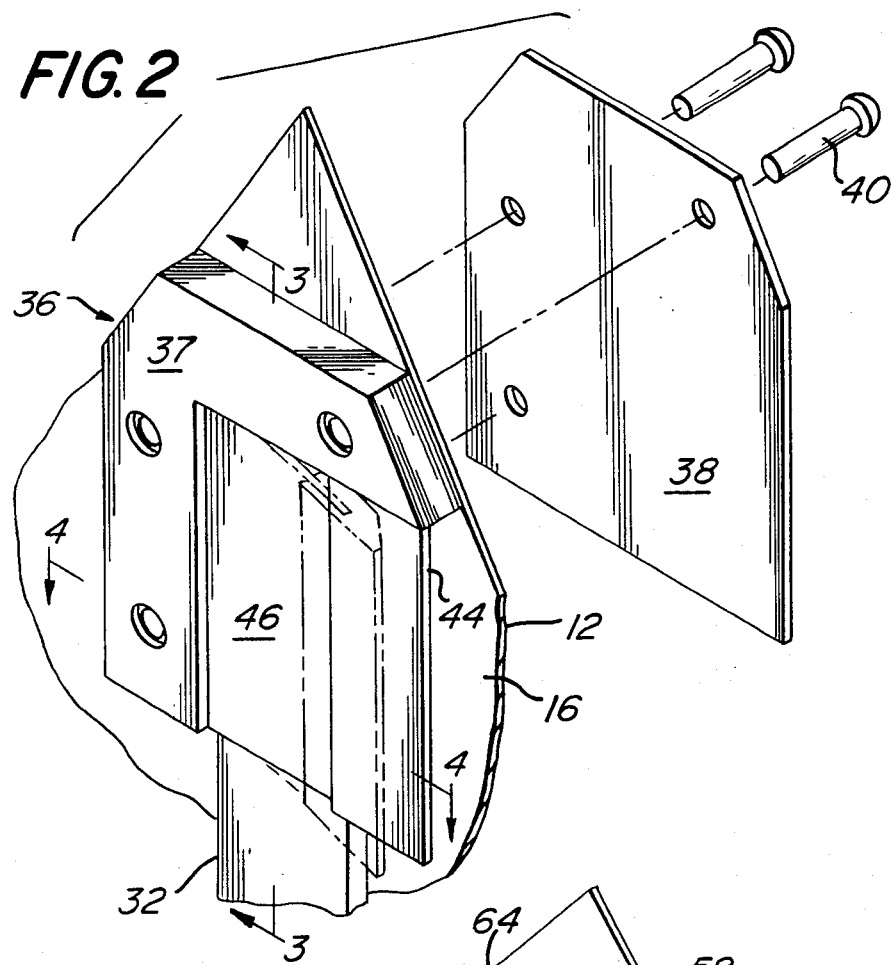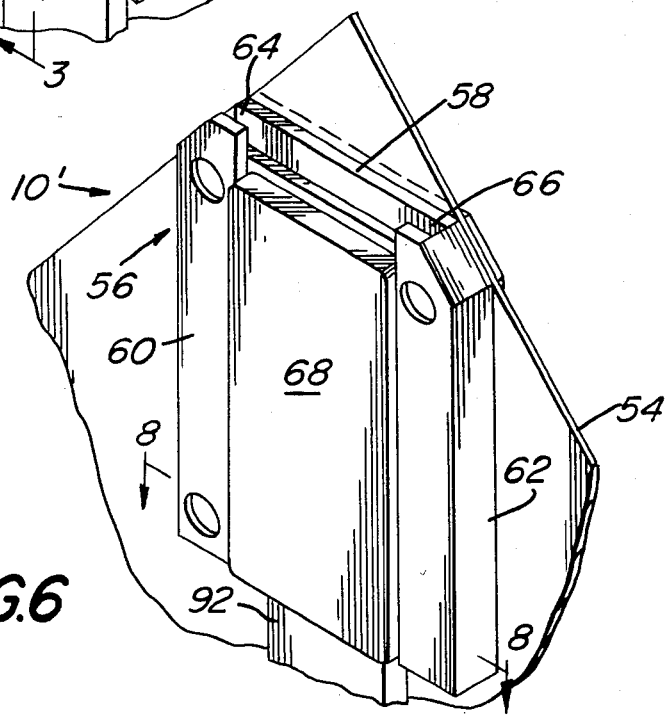

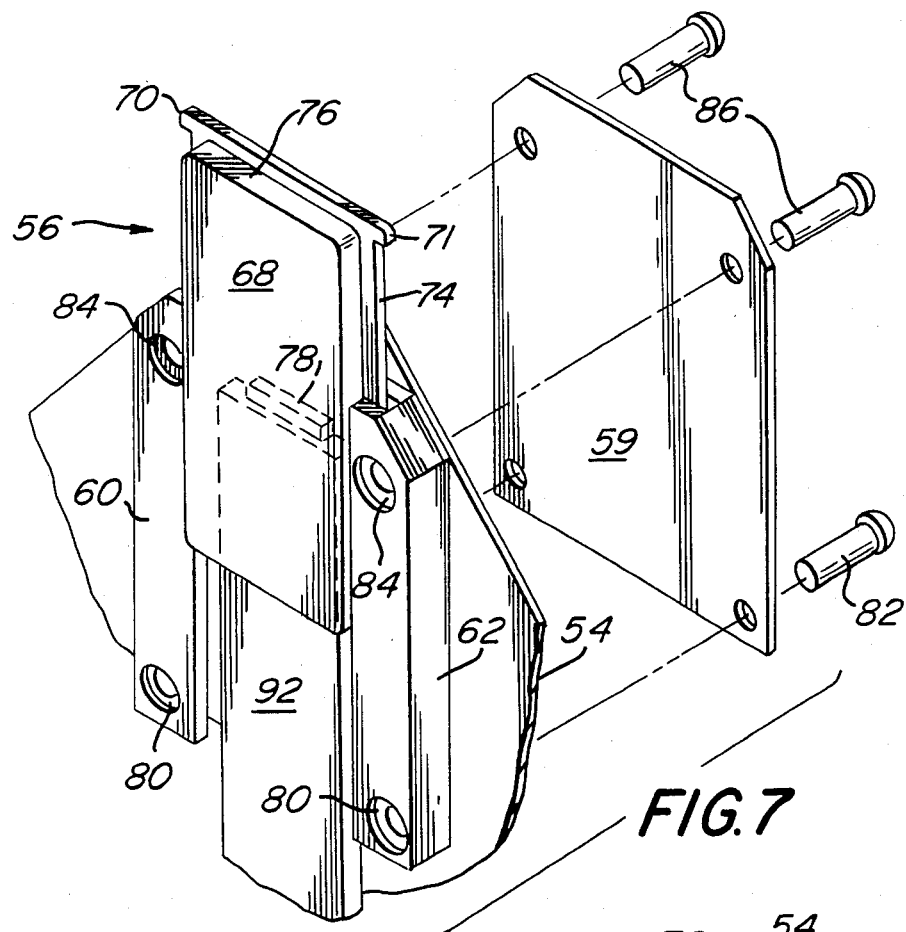
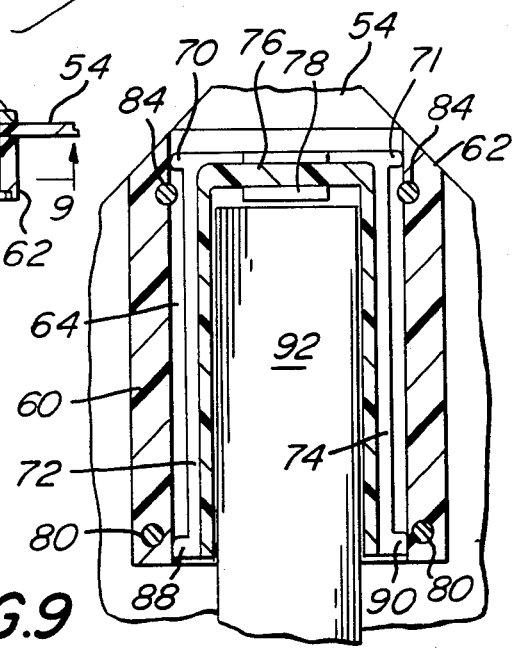
FIG.7
FIG.8
FIG.9

RIGID MECHANICAL CORNER POCKET FOR TENSIONING FLEXIBLE SIGNS AND SIGNAL DEVICES

BACKGROUND OF THE INVENTION

Flexible signs and signaling devices are known. The tensioning of a flexible sign is old and well known. U.S. Pat. No. 1,873,178 discloses "eyes" fastened to the corners of a flexible sheet. The "eyes" cooperate with tongues fastened to the ends of resilient struts (battens) which support and tension the sheet. Due to external wind forces exerted on the "eyes" and "tongues" while the sheet is tensioned, the "eyes" particularly, and the "tongues" occasionally, are known to tear away from the members to which they are fastened, whereby tensioning of the flexible sheet is no longer possible.

A more common solution is to provide cloth pockets sewn to one side of a flexible sheet for receiving the ends of resilient battens. For example, see U.S. Pat. Nos. 3,200,786 and 3,526,200. Due to the manner in which the battens are inserted into the pockets, and the external wind forces acting on the sheet while the sheet is tensioned, the battens quickly wear a hole through the cloth pocket or the flexible sheet, whereby the flexible sheet can no longer be tensioned.

The present invention is directed to solution of the problems of how to removably couple a rigid batten to a flexible sheet of plastic or fabric in a manner which does not rely on the ability of a "fastener", such as "eye" or "hook", to be adequately attached to its respective member so as to withstand the external forces of the wind without becoming unanchored, and the problem of the batten wearing through the corner pocket. A further discovery of the present invention solves the heretofore inherent problems associated with inserting the flexible battens into the corner pocket(s) (1) without necessity of flexing the batten to accomplish the procedure; (2) eliminates the potential for damage to the fabric sheet or oppositely disposed corner pockets; and (3) avoids any potential for human injury which could result from the sudden "untensioning" of the batten during the insertion procedure.

SUMMARY OF THE INVENTION

The present invention is directed to a collapsable signal device which includes a sign having indicia on one surface and having its other surface attached to a frame. A plurality of oppositely disposed pockets are fixed to the other surface of the sign. The frame includes mating portions extending into each pocket for tensioning and supporting the sign. Each pocket includes a retainer having a cavity for receiving its mating portion of the frame and a movable member for controlling entry and removal of the mating portions relative to their associated cavities.

It is an object of the present invention to provide a novel signal device which overcomes difficulties of the prior art in a reliable manner.

Other objects and advantages will be set forth hereinafter.

For the purpose of illustrating the invention, there is shown in the drawings a form which is presently preferred; it being understood, however, that this invention is not limited to the precise arrangements and instrumentalities shown.

FIG. 1 is a rear perspective view of the signal device.

FIG. 2 is an exploded view of the structure embraced by the dotted circle in FIG. 1 and rotated 90° counter clockwise.

FIG. 3 is a sectional view taken along the line 3—3 in FIG. 2.

FIG. 4 is a sectional view taken along the line 4—4 in FIG. 2.

FIG. 5 is a view similar to FIG. 4 but showing a batten being introduced into the cavity.

FIG. 6 is a partial perspective view of a signal device in accordance with another embodiment of the present invention.

FIG. 7 is an exploded view of the structure shown in FIG. 6.

FIG. 8 is a sectional view taken along the line 8—8 in FIG. 6.

FIG. 9 is a sectional view taken along the line 9—9 in FIG. 8.

DETAILED DESCRIPTION

Referring to the drawings in detail, wherein like numerals indicate like elements, there is shown in FIG. 1. a portable collapsible signal device in accordance with the present invention and designated generally as 10. The device 10 includes a flexible sheet 12 made of paper, fabric, or plastic having a front face 14 and a rear face 16. Sheet 12 is preferably rectangular but may have other shapes. On the front face 14, there is provided indicia such as "CONSTRUCTION AHEAD", "STOP", "SLOW", "MEN WORKING", etc. The rear face 16 of the sheet 12 is removably attached to a self-supporting frame 18. Frame 18 preferably includes ground-engaging elements in the form of a collapsible support 20. The legs of support 20 are adapted to pivot upwardly to a collapsed position. Support 20 is connected to an upright member 22 which may be flexible if desired to provide adjustable wind deflectability. Member 22 is connected to a collar 23 which receives the lower end of a tubular frame member 24. Member 24 is adjustably connected to extension 25. A lower sign corner retaining bracket 27 on member 24 embraces and retains the lower corner of the sign.

The sheet 12 is tensioned by resilient battens 30, 32 which are preferably rigid plastic members rectangular in section. Suitable dimensions for the battens are 3 cm wide and 0.5 cm thick, but may have other dimensions. The battens 30, 32 are joined at their centers by means of a rivet or bolt, and are swiveled to each other and retained by a sign mounting bracket 34 on the extension 25.

The ends of the battens 30, 32 are preferably coupled to oppositely disposed portions of the sheet 12 in the following manner. Batten 30 is preferably riveted or otherwise secured to the sheet 12 and extends across opposite corners. A flag, light-holder, and upper sign corner retaining bracket 26 may be attached to the upper end of extension 25 and cooperates with the lower sign corner retaining bracket 27 to thereby embrace opposite corners of the sign. A mechanical corner pocket (hereafter referred to as a retainer) fabricated from a rigid material is attached by means of a permanent anchor (hereafter referred to as an anti-tear member) to each of the remaining two oppositely disposed corners of the fabric sheet 12, for the purpose of receiving and retaining the oppositely disposed ends of batten 32. Both retainers 36 are identical. (It should also be noted that a retainer 36 may be attached at the two oppositely disposed corners of the sign supported by batten 30, if so desired. Should that be the case, all four retainers 36 would be identical.) Hence, only the retainer 36 circumscribed in FIG. 1 will be described in detail.

As shown more clearly in FIGS. 2-5, the sheet 12 is sandwiched between plate 37 and an anti-tear member 38. Fasteners 40 extend through aligned holes in plate 37 and member 38. The fasteners 40 are preferably rivets. The fasteners 40 extend through holes in the sheet 12 to thereby secure the sheet 12 to the retainer 36. As shown more clearly in FIG. 2, the plate 37 is generally L-shaped.

A movable member 44 is connected to the plate 37 by way of a resilient hinge 46. Plate 37, hing 46, surface 52 on member 44 and sheet 12 cooperate to define a cavity 45. Cavity 45 receives one end of the batten 32.

Member 44 has a beveled surface 48 adjacent to the rear surface 16 on the sheet 12. Also, surface 48 is on the portion of the member 44 remote from surface 52. In order to insert the end of batten 32 into the cavity 45, the batten is positioned adjacent surface 48 and moved in the direction of arrow 50. Member 44 is cammed to the position shown in FIG. 5 as the batten 32 enters the cavity 45. Thereafter, member 44 returns to the position as shown in FIG. 4. Thus, no tensioning of resilient batten 32 is necessary in order to insert the end of batten 32 into the cavity 45.

In order to remove the end of the batten, it is necessary to apply finger pressure to surface 48 and move member 44 from the position shown in FIG. 4 to the position shown in FIG. 5. When installed, batten 32 has its opposite ends received in, and retained by, a cavity within the retainer (the mechanical pocket). When the sheet 12 is made of plastic, with the retainers being made of plastic, and the battens being made of plastic, there is minimal ocassion for failure of the several members as a result of corrosion, misuse, abuse, or material fatigue due to the stresses exerted by external forces (i.e. wind), while at the same time there is provided a tensioning means for the sheet 12 which does not include pockets, or other fastening means, which are easily damaged, worn-through by abrasion, or removed from the sheet 12 (except with the use of tools).

In FIGS. 6-9, there is illustrated another embodiment of the present invention designated generally as 10'. The signal device 10' is the same as device 10 except as will be clear hereinafter. In device 10', the sheet 54 corresponds to sheet 12. Sheet 54 is provided with a plurality of oppositely disposed retainers 56. Retainer 56 includes a plate 58 and anti-tear member 59 between which the sheet 54 is sandwiched.

The plate 58 has upstanding side walls 60, 62 which define a channel therebetween. Wall 60 has a groove 64 extending along the length thereof and communicating with the channel. Wall 62 has a similar channel 66. See FIG. 8.

A slide 68 is reciprocally disposed in the channel. Slide 68 has a tongue 72 extending into groove 64 and a tongue 74 extending into groove 66. Tongue 72 has a projection 70 which engages the vertical side wall of the groove 64. Tongue 74 has a projection 71 which engages the vertical side wall of the groove 66. The projection 70, 71 are at one end of the slide 68.

The slide 68 has an end wall 76 perpendicular to the plate 58. Within the channel, plate 58 has an upstanding limit stop 78. The innermost position of slide 68 is defined by contact between end wall 76 and limit stop 78 as shown in FIG. 9.

Holes 80 are formed within the side walls 60, 62. Fasteners 82 extend through the holes 80, the sheet 54, and mating holes in the member 59. The side walls 60, 62 are provided with a second set of holes designated 84. The distance between the axes of holes 80 is greater than the distance between the axes of the holes 84. See FIG. 9. The holes 84 partially extend through the grooves 64 and 66. Fasteners 86 extend through the holes 84, the sheet 54, and mating holes in the member 59. Fasteners 86 are preferably rivets.

The slide 68 at the end opposite from the projection 70, is provided with a similar projection 88. Also, the slide 68 at the end opposite projection 71 is provided with a similar projection 90. Each retainer 56 embraces an end portion of a batten 92 which corresponds to the batten 32.

In order to insert an end portion of batten 92 into the retainer 56, slide 68 is reciprocated until projections 88, 90 contact one of the rivets 86. Rivets 86 prevent complete withdrawal of the slide 86. The end portion of the batten 92 is inserted until it contacts the limit stop 78. Thereafter, the slide 68 is returned to the position shown in FIG. 9 wherein end wall 76 contacts the limit stop 78. The end portion of the batten 92 is now removably captured. In order to remove the batten 92, it is necessary to reciprocate the slide 68 until projections 88, 90 again contact the rivets 86. It will be noted that the rivets 86 perform the added function of acting as a limit stop for the slide 68.

After the ends of battens 32 or 92 are released from their retainers, they are separated from the support member 34 of frame 18. Thereafter, batten 32 or 92 may be manually swiveled to overly their mating batten. Thereafter the flexible sign is wrapped around the battens. The frame 18 is thereafter collapsed by lowering extension 25 and pivoting the legs of support 20 upwardly.

In each embodiment of the present invention, a retainer is removably attached to opposite portions of the sign and includes a movable member for facilitating entry and/or removal of an end portion of a rigid batten. Each embodiment of the present invention preferably includes an anti-tear member which minimizes the tendency of tearing the flexible sheet off the retainers. In each embodiment, the movable members remain at all times as part of the retainers and thus are not likely to be lost. The retainers are preferably made from transparent plastic material or opaque plastic material which matches the color of the associated flexible sheet.

The present invention permits the sign to be rigid or flexible. When the sign is rigid, the anti-tear members are not needed. By eliminating the need to tension the batten prior to insertion in the retainer, a serious threat to human injury is eliminated.

The present invention may be embodied in other specific forms without departing from the spirit or essential attributes thereof and, accordingly, reference should be made to the appended claims, rather than to the foregoing specification, as indicating the scope of the invention.

It is claimed:

1. A signal device comprising a frame, a sign having indicia on one surface, a plurality of oppasiately disposed retainers of rigid material fixed to the opposite surface of said sign, said frame including a horizontally disposed member having at its end portions mating structure extending into each retainer for supporting said sign, each retainer having a cavity for receiving its mating portion of said frame and a movable member for controlling entry and removal of said mating portions relative to their associated cavities.

2. A device in accordance with claim 1 wherein the sign is a flexible sheet sandwiched between and secured to a plate and an anti-tear member which form part of said retainers, each movable member being supported by its associated plate.

3. A device in accordance with claim 2 wherein each movable member is slidably supported by its plate.

4. A device in accordance with claim 2 wherein each movable member is hinged to its plate.

5. A device in accordance with claim 1 wherein said frame has ground engaging means supporting a pair of battens, one of said battens being said horizontally disposed member.

6. A device in accordance with claim 5 wherein the second batten is fixedly secured to said sign and pivoted to said one batten.

7. A device in accordance with claim 1 wherein each retainer includes a plate-like member having upstanding side walls, each side wall having a groove contiguous with a channel between the side walls, a slide reciprocally supported in the channel and having a tongue extending into each groove, limit-stop means defining the operative and inoperative position of the slide, in its operative position said slide cooperating with said plate-like member to embrace opposite sides of an end portion of a batten, the batten constituting said mating portion of frame, and said slide being said movable member.

8. A device in accordance with claim 7 including first and second limit stops for limiting the extent of reciprocation of said slide relative to said plate-like member.

9. A device in accordance with claim 1 wherein each retainer includes a plate-like member, said movable member being connected to said plate-like member by a resilient hinge, said resilient hinge overlying an end portion of a batten, said batten constituting said mating portion of the frame, and said hinge facilitating pivotable movement of said movable member relative to said plate-like member to facilitate said entry and withdrawal of the batten.

10. A device in accordance with claim 1 wherein said sign is rectangular with converging upper edges extending to an upper corner and diverging lower edges extending from a lower corner, means on said frame for engaging the upper and lower corners, said sign being made from a flexible material, said retainers being attached to the remaining corners of said sign.

11. A device in accordance with claim 1 wherein said movable member has a cam surface thereon and adapted to be moved by contact with said horizontally disposed member upon entry of a mating portion of said member into its associated cavity.

12. A signal device comprising a flexible sheet having a plurality of rigid retainers affixed thereto on one side thereof to facilitate coupling the sheet to tensioning members on a support frame, each retainer including a plate-like member fixedly secured to a peripheral portion of said sheet, a movable member associated with each platelike member for controlling entry and removal of a mating portion of a frame in a manner so that at least a portion of said movable member may embrace a side face on an end portion of the mating portion of the frame and prevent inadvertent withdrawal therefrom.

13. A device in accordance with claim 12 wherein each retainer includes an anti-tear member, said sheet being sandwiched between said members of each retainer and fixedly secured thereto.

14. A device in accordance with claim 12 wherein said sheet is rectangular, and one of said retainers being located adjacent each of two oppositely disposed corners of the sheet.

15. A device in accordance with claim 12 wherein said mating portion of a frame is a horizontally disposed batten.

* * * * *